(12) United States Patent
Maynard, Jr.

(10) Patent No.: US 6,426,739 B1
(45) Date of Patent: Jul. 30, 2002

(54) APPARATUS FOR PROVIDING DIRECTIONAL SIGNAL CONTROL WHILE SUPPORT A LIMB AT A WORKSTATION

(76) Inventor: Stuart Tyrus Maynard, Jr., 12 Lookout Rd., Asheville, NC (US) 28805

( * ) Notice: Subject to any disclaimer, the term of this patent is extended or adjusted under 35 U.S.C. 154(b) by 1046 days.

(21) Appl. No.: 08/772,840

(22) Filed: Dec. 24, 1996

Related U.S. Application Data

(63) Continuation of application No. 08/438,538, filed on May 10, 1995, now Pat. No. 5,635,955, which is a continuation of application No. 08/280,580, filed on Jul. 25, 1994, now abandoned, which is a continuation of application No. 07/419,400, filed on Nov. 13, 1989, now abandoned, which is a continuation of application No. 07/089,336, filed on Aug. 20, 1987, now abandoned.

(51) Int. Cl.[7] .................................................. G09G 5/08
(52) U.S. Cl. ................. 345/157; 345/156; 345/471 XY
(58) Field of Search ................................ 345/157, 156; 74/471 Y

(56) References Cited

U.S. PATENT DOCUMENTS

| | | | | |
|---|---|---|---|---|
| 4,712,101 A | * | 12/1987 | Culver | 345/157 |
| 4,724,715 A | * | 2/1988 | Culver | 345/157 |
| 4,799,049 A | * | 1/1989 | Avila | 345/157 |
| 4,823,634 A | * | 4/1989 | Culver | 74/471 XY |

* cited by examiner

*Primary Examiner*—Matthew Luu

(57) ABSTRACT

There is provided an apparatus for supporting one's limbs, preferably one's arms, while at a workstation which may be a computer keyboard. The apparatus includes a pair of rollers mounted on an axle. The rollers are especially adapted to support the forearms and will rotate as well as move in axial directions. The rollers are maintained at a predetermined distance from the workstation and are adjustable in the horizontal and vertical directions. A sensor is mounted on the axle and is periodically contacted by the rollers to provide information to the computer. By various methods of sensing roller movement, the rollers may generate data for computer or machine control as well as support the arms in various tasks.

6 Claims, 6 Drawing Sheets

APPARATUS FOR PROVIDING DIRECTIONAL SIGNAL CONTROL WHILE SUPPORT A LIMB AT A WORKSTATION

This application is a continuation of application Ser. No. 08/438,538 filed May 10, 1995, now U.S. Pat. No. 5,635,955, which is a continuation of Ser. No. 08/2,80,50 filed Jul. 25, 1994, which is a continuation of Ser. No. 07/419,400 filed Nov. 13, 1989, which is a continuation of Ser. No. 07/087,336 filed Aug. 20, 1987.

BACKGROUND OF THE INVENTION

This invention relates to an apparatus for relieving muscular tension at a workstation which requires use of one's hands or feet. More particularly, it relates to an apparatus for use in conjunction with a computer or other keyboard to prevent the operator from having excessive upper body tension as well as in conjunction with other instruments where arm support during hand assembly or control panel use is found to be an aid.

Application to Keyboard Operations

Operators of business machines such as word processors, computers and typewriters often find muscular tension in the back, neck and arms because the arms must be elevated and suspended over the keyboard. Furthermore, often the operator will remain unconsciously tensed in the ready position even though he is not entering data. This is motivated by the wish to keep the fingers in constant reference to special keys on the keyboard. When this happens for a prolonged period of time, the discomfort of muscular strain can occur during work there for lasting afterwards. Furthermore, when there is muscular tension it is common for the operator to make errors. To alleviate this, a large number of work breaks are required in order to relieve the muscular tension.

Various devices have been developed for use in conjunction with a keyboard enabling the operator to rest his hands or arms while operating the keyboard. Some of such devices are disclosed in U.S. Pat. Nos. 4,482,063, 4,481,556, 4,482,064, 3,300,250, and 1,801,669. However, all of the devices disclosed in the above referenced U.S. Patents are static; therefore, there will be an amount of friction between the person's arms and the contacting surface of the device when sufficient movement of the hands a across the keyboard in the horizontal plane is attempted. Such movement of the hands calls for a momentary lift of the arms from the surface to avoid friction which can suddenly release or bind depending on skin moisture, adhesion, and the texture of the surface.

A further problem arises in the use of cursor control devices which are either not on the keyboard or form part of a numeric keypad located adjacent to the keyboard. The cursor control device may be a speed aid but the hand(s) must be removed from favored reference keys on the keyboard to use such as control. Although it would be advantageous to have the cursor device in continuous contact with the operator all fingers are usually already committed to keyboard contact.

Small Instrument Manipulation and Small Part Assembly

Consider a simple generics and repetitive task of picking up a delicate object with a forceps at one location and depositing it in a proper orientation at a new location. An arm rest to aid the, hand would be desirable at two locations the object, source, and find destination but even then the arm would have to transport between these supports and guard against too forceful an impact with the second site. Again static supports may create erratic effects of friction against the skin. Perhaps the second site of deposit might be also moving on a slow assembly line or the assembly process could be enhanced by such movement. Additionally other variations could entail more than one site source for acquiring special parts or multiple deposit site.

To address these assembly problems, two or more arm rests could be of benefit even disregarding the act of moving between sites. Rather than a multiplicity of static supports, a moving support would be beneficial, including a support which eliminates the requirement of multiple landing impacts.

Even disregarding direct hand assembly of small parts, the operation of such that arm fatigue occurs while remaining at one or more switch sites types of hand controls or switches on diverse panel arrangements may benefit from arm support especially if the switches require constant adjustment for various processes.

In these applications each has a distinct range of work surfaces or panel arrangements but they have a common need for aid to hand function by means of arm support. The arm support should cater to various demands on the operator including; ongoing use at a dominant location or control, non-use of the hand but maintaining a ready position at a favored location, and support during transfer and landing at new locations.

Foot and Ankle Function Aided by Leg Support

Generally a foot operates a control rather than directly manipulating an object such as in part assembly. In common practice the leg is supported by the heel and the control is affected by both ankle and foot motion. When more than one control is addressed or there is need to modify pressure on a single variable control then tension in the leg and the muscles of the abdomen and lower back may be required. Support at the lower leg would provide benefits analogous to arm support for hand functions. Because leg mass and muscle groups are primarily used for body transport the effort to elevate the weight of a leg for protracted tasks is perhaps more unusual and distracting to the effort of coordinating foot and ankle function than the act or reaching with the arm for hand functions. Sometimes foot controls may be useful in situations where the operator must be relatively supine, prone, or reclining on the side such that differing muscle groups must contend with a disadvantageous support of the extended leg. Since foot controls are often used on heavy machinery, issues of fatigue and accident prevention are at stake rather than the issue of keyboard error.

Operations Affected by Motion and Gravity

As discussed gravity can produce fatigue; and predictable motion, such as that of an assembly line, can create new functional demands. However, when the whole environment of the operation is affected by motion such as operation onboard any type of vehicle, then shifting relationships of the vehicle and a work surface, keyboard, or instrument panel can occur with respect to the operator who has an independent inertia. A seat belt merely constrains an operator's main body to these changes. An outreached limb performing tasks also experiences inertial shifts and could benefit from a limb support which at least partially imparts motion that approximates the to the limb of the fixed work items which are unboard. To compensate for a sudden downward shifts, a seated operator in motion can maintain a constant downward pressure on a support and with training an unconscious compensation is in place to follow sudden down shifts of reduced G force. However, such constant downward reference would increase the friction against any static support and use against an arm or leg surface. Uplift, which represents increased G force, and some amount of side to side force can be imparted to an arm or a leg by way of the support which is fixed to the moving craft. If uplifts are constant to significant levels of G force, then fatigue may become a major obstacle to effective limb operations which can be compensated by supports. In vehicles with complex manual vehicle control systems, or complex procedures carried on for other than vehicle control, operator limb support may be desirable with the same concerns range and continuity of contact as previously described.

Handicapped Operator Aids

An inadequacy of strength in some muscle groups of a given limb in use may affect the accuracy and endurance of an otherwise achievable distal hand or foot function. This situation could be caused by birth defect, direct injury, neurologic events, and also a unique class of proximal muscular dystrophies. Again the issues of continuous proprioceptive contact with support over a range of locations are pertinent. Incorporation of a convenient data acquisition or control device, such as cursor movement, directly into the support may be of even more value to the handicapped operator.

Furthermore having a support which eliminates friction against fixed surfaces and which allows for continual support during movement between sites would be desirable.

Safety

A basic method of safety control of machines is to provide safe zones to which the hands or feet must be placed to activate the machine controls. These safe zones are another movement in the work process and the switches at the safe zones are another target of manipulation. In a process such as assembly that requires arm movement at a vulnerable location, it may be beneficial to have a moveable arm support both to move the support from the area of machine action along with the appendage and to guide the appendage to the safe zones and site of machine control.

There is also a need to provide zones of safety for users of potentially dangerous equipment which provides for machine activation without danger to the limbs.

OBJECTS OF THE INVENTION

It is therefore one object of this invention to provide an apparatus for relieving muscular tension for a machine operator or control panel operator who uses his arms or legs.

It is another object to provide an apparatus for enabling a keyboard operator to work more efficiently and effectively for longer periods of time.

It is another object to utilize an apparatus which provides constant support and proprioception and minimum friction with the support during movement between desired limb positions.

It is another object to provide an apparatus for supporting one's arms or legs while providing information through a sensor.

It is still another object to enable a keyboard operator to provide information, especially continuously variable direction information to a computer or other machine control systems without using one's thumb or fingers and allowing the operator to maintain the arms in continuing support during movement and also freeing the thumb or fingers from cursor duties, allowing their continual contact with the keyboard.

SUMMARY OF THE INVENTION

It is still another object to enable a supported limb to be assisted by a movable support between disparate zones of work and safe zones or sensing zones where engagement of machine control is exclusively desirable.

In accordance with one form of this invention, there is provided an apparatus for supporting one's arms while one's hands are used at a workstation. One application is that of a keyboard for data input or computer. control. The apparatus includes at least one roller adapted to contact a portion of the arm. An axle whether virtual or real is provided to support the roller and to permit the roller to rotate. Preferably the also axle defines a path of side to side positioning for the roller.

Although curved axles could be used in certain settings, the straight axle is normally adequate for most applications.

The axis of rotation could be offset from the axis of slide including rotation on a raceway suspended below the axle or carried upon a trolley apparatus which rides on the axle path, however in the chosen form the axis of rotation and of slide are one and the same, consisting of a real axle through the center of the roller.

Preferably two rollers are used so that each arm is supported. Although various cross sectional shapes of rollers could offer aid to forward and back motion of the forearm across the support axle, including a plain cylinder, the cross section preferred is a cylinder with a larger flared diameter at each end so that the arm will engage the cylinder to carry it in lateral movements along the axis of slide. Various materials can be turned to this shape in solid form, however the preferred cross section should be hollow for lighter weight and so that the spine roller can travel on curved axles which might be selected for various applications. This also reduces bearing surface area to only the two ends of the roller where a simple durable bushing is a enhancement.

The above described configuration is preferred although the roller and an axle could be a single unit which only rotates and only slides at bearings housed in support brackets to either side.

Although the preferred axle described could be permanently anchored to a work surface or desk which supports the keyboard, a clamping system may be provided to allow for removal. The clamp may employ a compression and an expansion screw similar to a carpenter's clamp but additionally it may allow for movement along a bracket. Also since the exposed underside of a desk top overhang may be only part of an inch, there may be a provision for the lower jaw piece to have the smaller bite or larger bite in two choices of orientation.

Although the axle could be clamped in one position in relation to work surface, preferably the bracket is provided with the axle at desired distances out from the desk top. Another extension may also be provided to allow for adjustment of the axle up and down. The preferred objective is adjustability outward and downward from the front edge of the work surface while other adjustments could be provided by other orientation for other work settings. While the adjustments could be intermittent choices, continuously sliding adjustment with slots is possible, and preferred.

The keyboard in use could be contained entirely on the desk top, however additional pieces that brace the brackets may also safely support the keyboard partially off of the desk top and incline it somewhat.

While the preferred form addresses support for table top keyboard use, various platforms for under table or under shelf suspension can allow for attachment of both the roller axle apparatus support principle and keyboard support. Where the security and convenience of drawer enclosure of the keyboard is desired an axle attachment is also adaptable. Since the drawer provides for inward outward motion of the axle, and the keyboard position along the drawer bottom is selectable, the axle needs only to retract from the drawer to allow roller rotation and some adjustability up and down. In a form for drawer mounting-a slotted square tube mount is retained as a pivoting bracket selectable some vertical adjustment of axle height during use.

In the embodiment where data input is determined by roller motion, which also allows in relation to a single sensory location can generate amplitudes in four vectors. Two vectors are provided by counting rotation increments clockwise or counterclockwise. Two more are obtainable by proximity sensing in the slide range either closer to or further from the sensor. Since the rollers move in the duty of support a switch may function when roller motion is to be translated into data input rather than mere ergonomic support. If a separate key or footswitch is provided to enable the mode of roller data input, then all vectors of each roller and multiple sensors can be used to generate data. In the one form, only the rotational vectors of each roller are sensed for directional and continuously incremented data generation. The proximity sensing in the slide range is relegated to enabling the data input mode, which is either on or off rather than continuously incrementable.

Mechanical rotation can be converted to electrical data by either analog or digital devices and ultimately may be converted to digital form for computer use or analog form in machine controls.

Analog signals are commonly generated by variable resistors moved by rotation. Various integrated, circuits can retain prior resistance values for comparison to newly received values to determine amplitudes of rotation. Directions of rotation can also be determined by ratio comparisons of two circuits on a variable resistor.

Digital signals can be generated by mechanical counts of cogs or bumps on a surface, but in more current technology photodiode sensors and circuits are employed to count on/off signals of light/dark patterns. One sensor can count amplitude and a pair of sensors arranged out of phase can provide data to determine direction of rotation for a given roller.

For either mechanical or photosensing of rotation, the portion of the roller sensed may be either the cylindrical or truncated surface, which is preferred in this application. Sensors for each roller may also be separated in location or provided in a housing unified, which is preferred.

In the preferred forms both a friction wheel variable resistor sensor and a photosensor reading barcode are shown in a composite example. The sensor locations for each roller are unified centrally for conservation of wiring and material and because an operator using both hands on the keyboard nonetheless usually has a space between the arms. The data input mode is enabled by an intentional central sliding motion by the operator's arms to engage either the friction wheel (analog example) or a contact switch (in The photosensor example) obviating the need for a footswitch or other switch for enabling the mode of roller data generations. However, a simple foot switch to enable the sensing mode may be provided for some applications.

Generating continuous incremental data from the slide range of the rollers can be conceived in at least two methods.

A source of analog data derived from a variable resistor can be obtained if the axle is modified to contain a longitudinal gradient of resistance and the moving roller can provide a variable contact. In such a design the altered axle could be various cross.-sectional shapes including one with a longitudinal groove to contain the resistance gradient, which is insulated from the axle. A contact pointer touching the exposed resistance gradient could conduct to the axle itself, effectively maintaining a complete circuit with a variable range of resistance positions which can be used to calculate direction and amplitude for cursor movement.

A second method for locating a roller along a range of slide would be echo location sensors reflecting sound off of the truncate face of a roller. This method is not depicted, because it requires no unique adaptation of the roller and axle components, but only the mounting of an appropriate echo sensing system at a reference location.

The circuitry used to process and convert electrical signals derived from the above described system is according to commonly known principles.

BRIEF DESCRIPTION OF THE DRAWINGS

The subject matter which is regarded as the invention is set forth in the appended claims. The invention itself, however, together with further objects and advantages thereof may be better understood with reference to the following description taken in conjunction with the accompanying drawings in which:

DESCRIPTION OF THE PREFERRED EMBODIMENT

Figure 1:
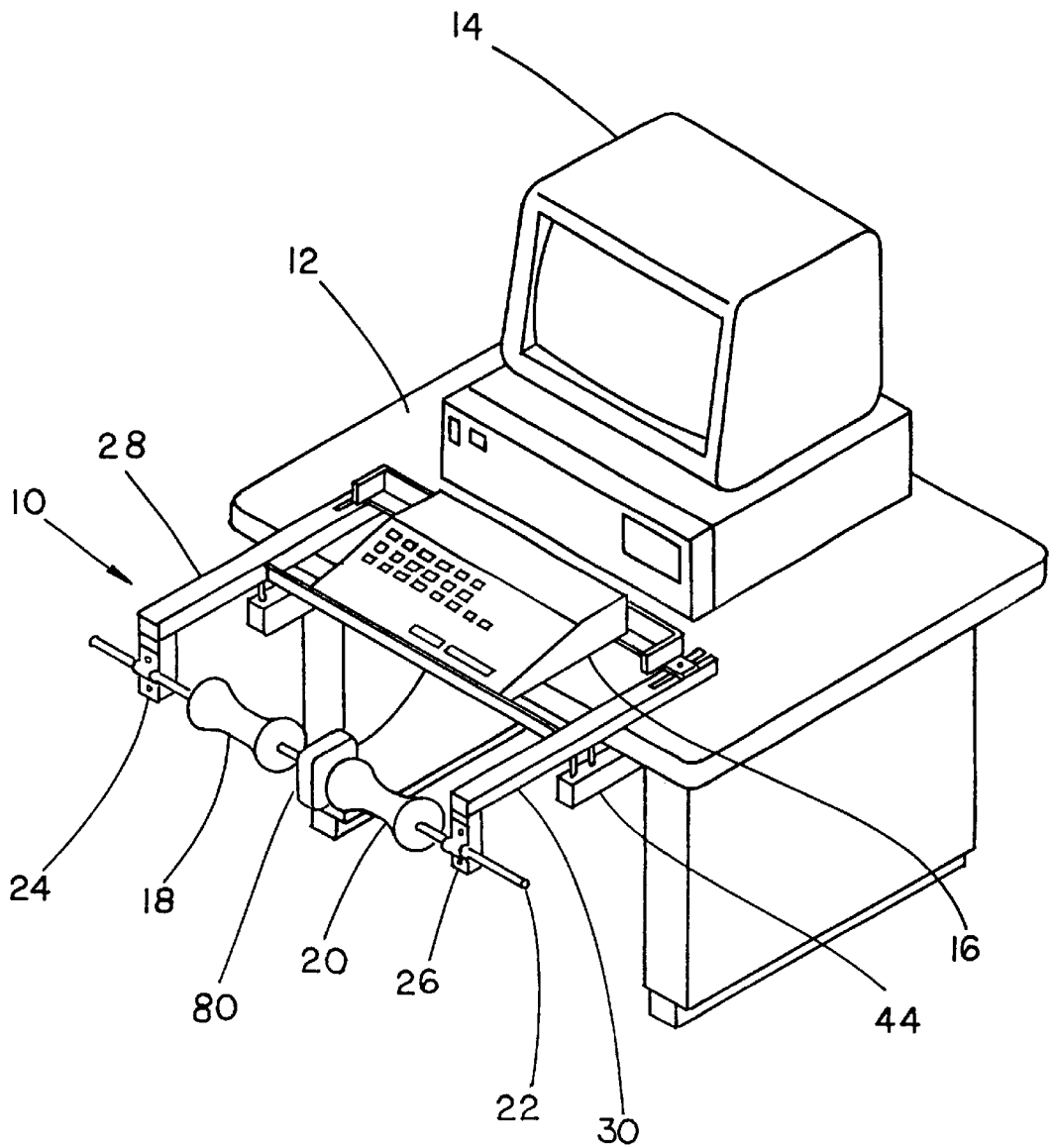
FIG. 1 is a pictorial view of the subject invention being used in conjunction with a computer and keyboard on a table.

Referring now more particularly to FIG. 1, there is provided support apparatus 10 mounted to table 12 upon which is received computer 14. Keyboard 16 is received on the'support apparatus 10. Support apparatus 10 includes a pair of rollers 18 and 20 rotatably mounted on axle 22. Axle 22 is mounted on extensions 24 and 26 which are in turn mounted on support arms 28 and 30, respectively, which form part of a frame for the support apparatus.

Figure 2:
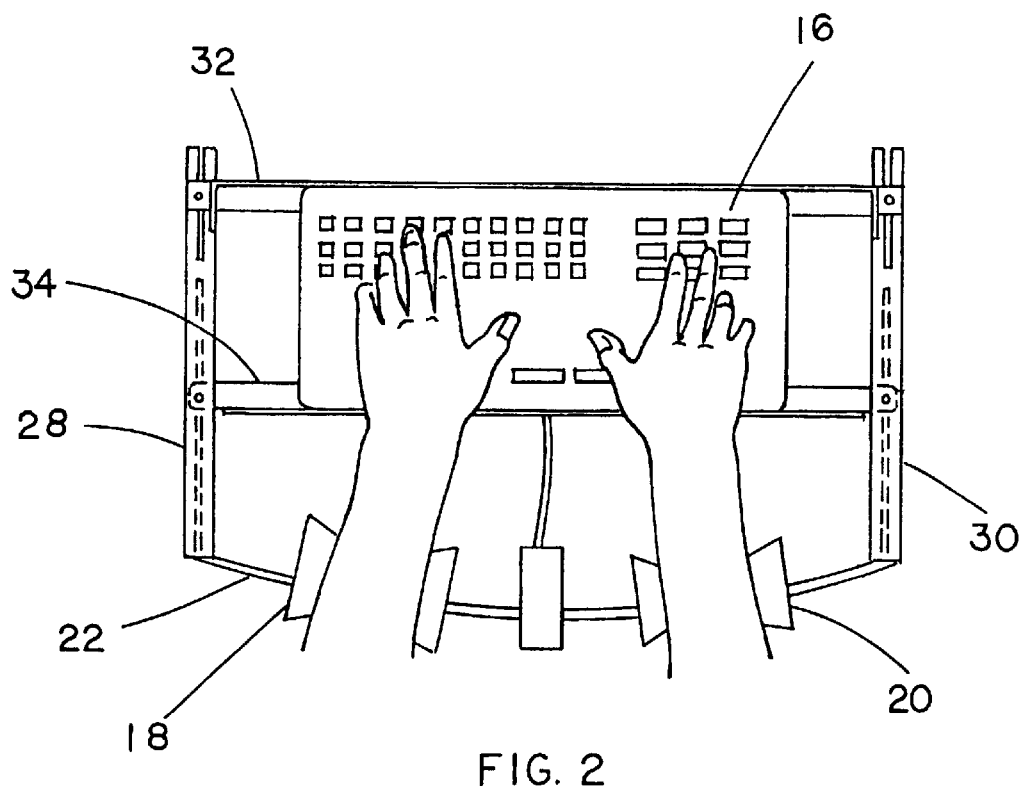
FIG. 2 is a top view of a portion of the apparatus shown in FIG. 1.

This may be better seen in reference to FIG. 2 which is a top view of the support apparatus showing the arms of a person utilizing a keyboard with his forearms resting on rollers 18 and 20. The remaining part of the frame portion of support apparatus 10 includes back bar 32 which is connected to arms 28 and 30 and may be elevated from mid-bar 34 which is also connected to arms 28 and 30. The front of keyboard 16 rests on bar 34, if it is to be partially supported out from the front edge of the desk. The rear edge of the keyboard can also be rested directly on the desk surface or optionally elevated slightly by adjusting bar 32 to fit beneath the keyboard.

Figure 3:
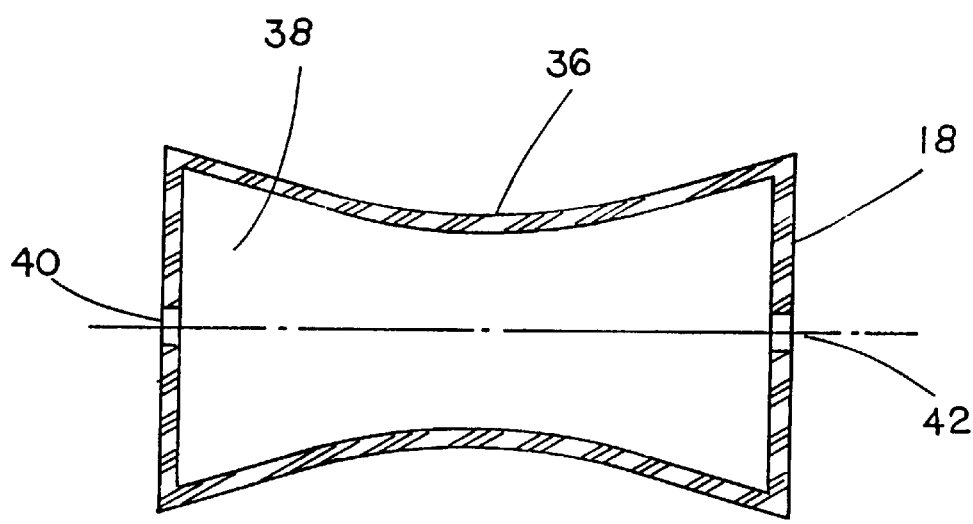
FIG. 3 is a sectional view of one of the rollers shown in FIG. 1.

Referring now to FIG. 3, roller 18 is shown in cross section and is preferably identical to roller 20. Roller 18, in its illustrated form, has concave surface 36 which is more comfortable to the forearm of the user than a straight surface. Roller 18 is substantially hollow as indicated by open space 38. Axle 22, which may be straight as shown in FIG. 1 or curved as shown in FIG. 2, is received in openings 40 and 42 of the roller. By making the inside of a roller hollow, a curved axle may be used without interfering with the rotating action of the roller. Preferably the rollers are made of a durable plastic material, although they could be made of wood or some other material.

Figure 4:
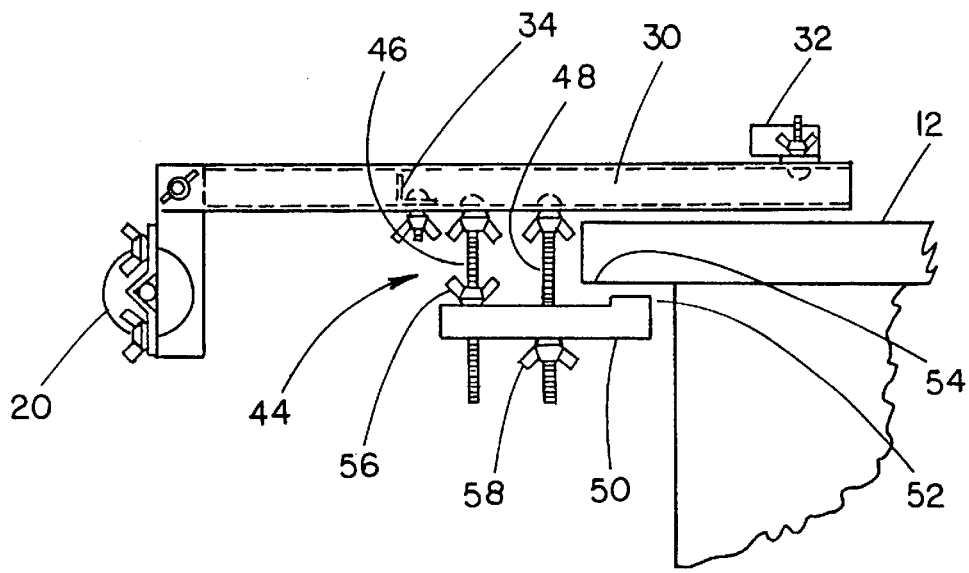
FIG. 4 is a side elevational view of the apparatus of FIG. 1 with the keyboard and computer having been removed.

Referring now again to FIG. 1, the support apparatus is held onto table 12 by means of clamp 44, one side of which is connected to arm 30, and an identical clamp (not shown) is connected to arm 28. As shown in FIG. 4, clamp 44 employs an expansion screw 46 and a compression screw 48. Normally, the expansion screw 46 is furthest from the desk edge and compression screw 48 is closest to the edge. The lower jaw piece 50 and the arm 30 are a pair of levers compressed in their middle areas and separated by the expansion screw; therefore their biting portions above and below the desk top must also compress. Arm 30 extends flush across the desk surface. Since the lower jaw piece 50 may encounter varying amounts of exposed undersurface for a given desk top, it may be rotated 180 degrees for either a smaller bite or a larger bite which is advantageous if available. In either case, there is a raised tip portion 52 to assure that compression is applied furthest in from the desk edge.

Bar 50 is held in place against the bottom of the table by means of wing nuts 56 and 58 which are on opposite ends of bar 50.

FIG. 4 also shows the function of the crossbrace pieces 34 and 32 which are simple 90 degree angle bars in this embodiment. The bar 34 is open to the rear and has a sliding adjustment along the slot in the underside of the arms 30 and 28 and one face of the angle is level with the desktop. Therefore the distance of the keyboard space-bar from the axle can be adjusted for various operators with varying forearm lengths. Regardless of the prior choice for distance from roller axle to desk edge, the distance from keyboard to roller axle is independently adjustable even providing the option to support the front of the keyboard out from the desk edge. The rear crosspiece 32 is also adjustable in a shorter slot in bracket piece 30, 29. Bar 32 is adjusted toward bar 34 until the keyboard is firmly pressed into the angle of front piece 34, however the keyboard rear can rest either on the desk surface or be elevated onto the angle of bar 32.

Figure 5:
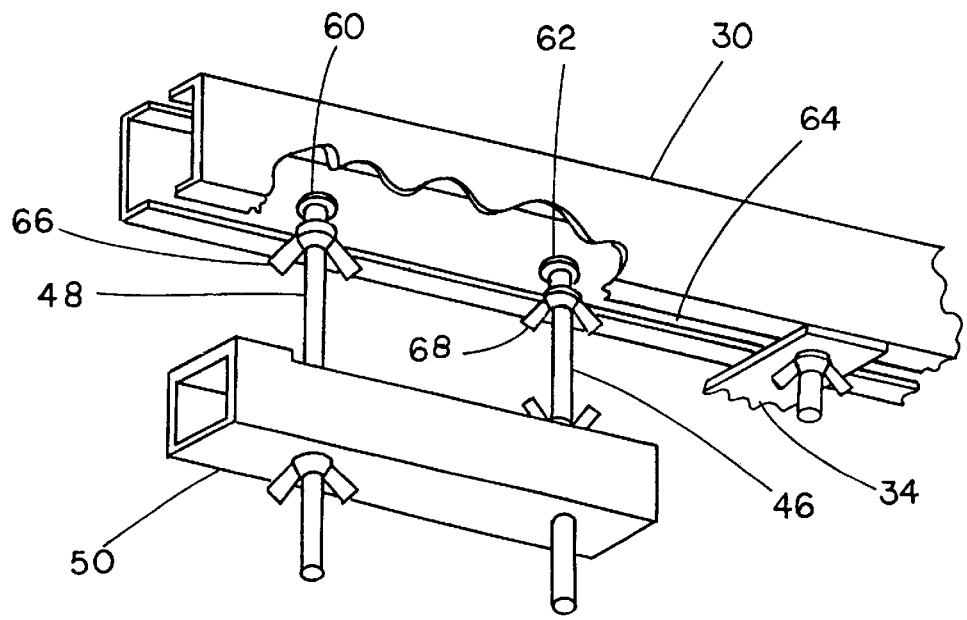
FIG. 5 is a partial pictorial view of the bracket shown in FIG. 4.
Figure 6:
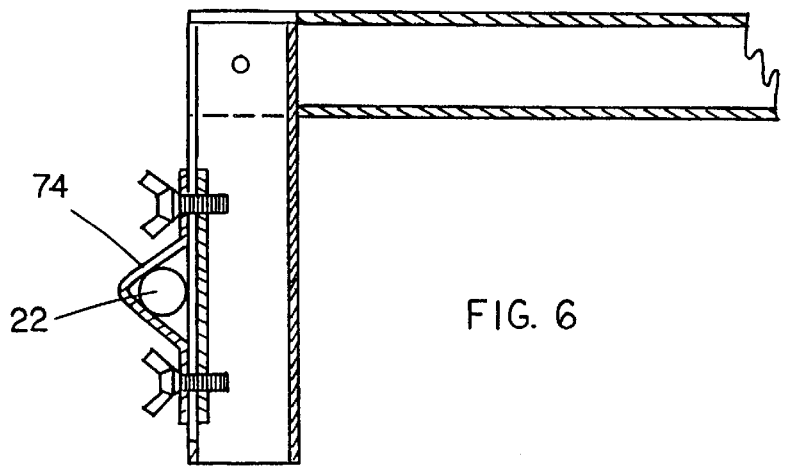
FIG. 6 is a partial pictorial view of the apparatus in FIG. 4 with portions cut away.

Referring now to FIG. 5, screws 46 and 48 include heads 60 and 62, respectively. These heads of the screws are received in elongated slot 64 on the bottom side of arm 30 and are slidably received therein. The construction is identical for arm 28. Wing nuts 66 and 68 may be tightened down to hold arm 30 at a predetermined position. Prior to tightening the nuts bar 50 may be slid along a portion of the length of arm 30 so that axle 22 and thus rollers 18 and 20 may be arranged at a chosen distance from desk edge. This adjustment is important because of the different lengths of people's arms. Usually, the operator should rest his forearms rather than his wrists on the roller. The height of axle 22 and thus the rollers may also be adjusted by means of moving clamp 70 along slot 72 in extension 24 as shown in FIG. 6. The construction is identical for extension 26. The axle holding the rollers is clamped against the front face of the extension pieces. Axle 22 is held in the concavity of an outer piece 74 by two winged thumb screws 76 and 78 which pass through the slotted front face of extension piece 24 and thread into respective sites of a spacer bar 77 that travels on the inner surface of piece 24. Tightening of the screws and the outer piece down onto the axle 22 holds it in position. A tab stop 79 or actual discontinuation of the slot at the bottom end of extension 24 prevents a loosened clamp and axle from accidentally dropping entirely out of the slot. Entry into the slot is from the open top of the tubing.

A pair of screws having heads are received in slot 72 and clamp 74 is received over axle 22. A pair of wing nuts 76 and 78 mate with corresponding screws for tightening the clamp down onto axle 22 to hold it in position. This vertical adjustment is important because operators are of different heights. It is desirable for the operator's shoulders to be in a natural position rather than elevated, which causes tension.

Referring again to FIG. 1, a sensing unit 80 is located between rollers 18 and 20 and is electrically connected to computer 14. The sensing unit 80 may be used in lieu of a mouse which is frequently used with the computer to move a cursor on a screen or it may be used in lieu of a cursor-moving apparatus on a normal keyboard. As described earlier, roller movement can affect sensors or switches with both rotation in two directions and slide in two directions. In the illustrated embodiment, roller motion is sensed on the truncated surface of each roller 18 and 20.

Also as described earlier, since the rollers function passively for arm support a mode for the generation of data by the roller motion must be intentionally enabled. Although this could be done by footswitch or other switch, the mode is enabled in the illustrated embodiment by the central slide of a roller to contact the sensing unit in this form. Therefore the slide motion of a roller is not dedicated to generation of updated incremental direction data, but accomplish only an on or condition.

Figure 7:
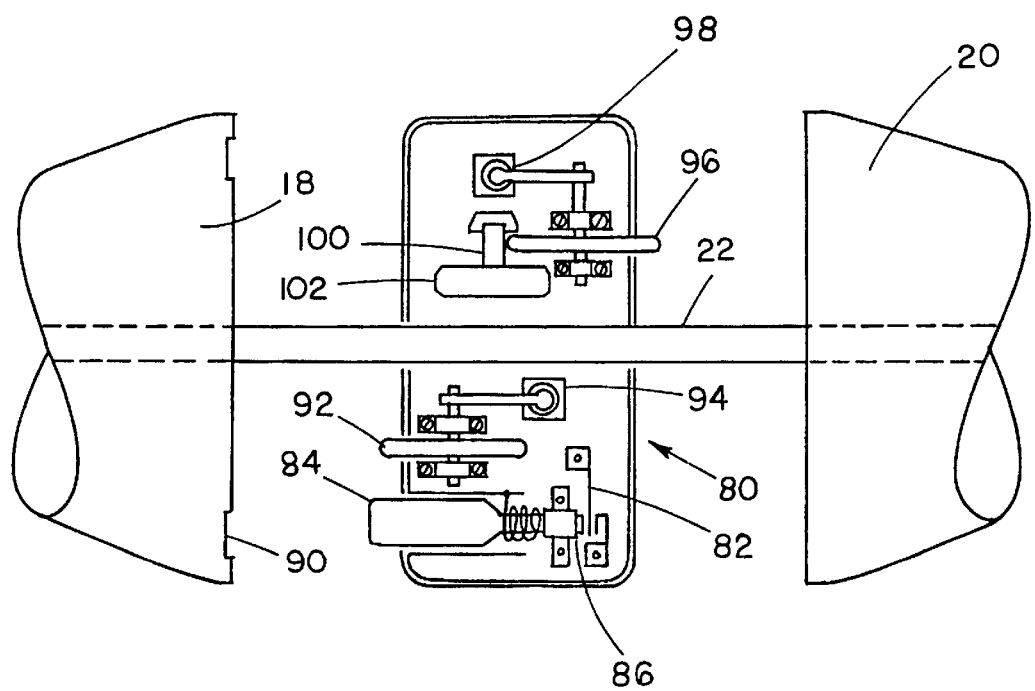
FIG. 7 is a front elevational view of a portion of the apparatus of FIG. 1, showing the sensor with the cover removed for clarity.
Figure 8:
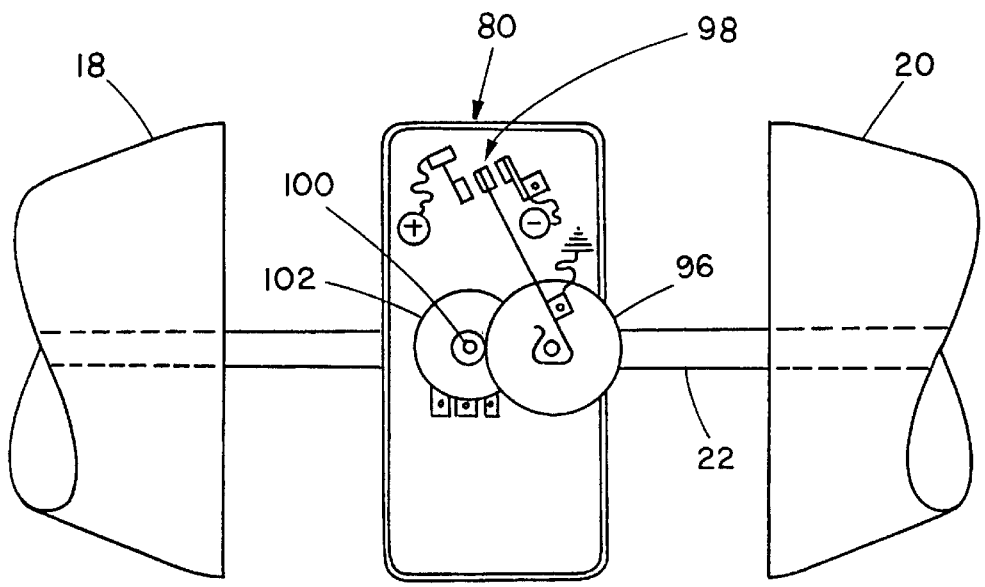
FIG. 8 is a top view of selected parts of the sensor unit rotated 90 degrees to the view shown in FIG. 7.

The sensing unit 80, shown in FIG. 7, uses the rotation of the right roller 20 to generate analog signals by moving of a friction wheel 96 which transfers rotation in either direction to the shaft of a variable potentiometer 102. The analog signal consists of a varying ratio of resistances on either side of the contact which rotates within the circularly arranged resistance gradient. Various known integrated circuitry (not shown) can translate the changing resistance ratios into increments for digital counts. Other known circuitry can retain previous values for comparison to sense reversal of rotation and also reset upon the condition of zero crossing on the variable resistor gradient. In this example of analog signal generation direction of rotation may also be determined by a clip switch 98 shown in FIG. 7 and FIG. 8 which includes a clip that moves with the axle of the friction wheel until it closes one of two circuits at one or two contacts points, after which it slips with further axle rotation in the same direction. In this analog example the enabling of roller data mode is can be provided by circuitry which retains previous resistance values for comparison so that any movement of the friction wheel by any roller contact generates new analog signal.

The form of digital data generation in this composite analog/digital example is shown for the left roller 18 with a photodiode 84 sensing movement of a barcode pattern in a circular track 90 on the truncated face of roller 18. Since a close consistent proximity to the sensor may be helpful for accurate sensing of the light and dark a bars, actual contact may be mandated by requiring actual contact with the photodiode sensor housings which is sufficient to trigger a contact switch 82 behind the photodiode thus enabling the generation of digital data. Spring tension on the photodiode can function to cushion impact on the photodiode and fully disengage the photodiode from the contact switch upon the release of roller pressure. Also as long as the contact switch itself is elastic so that the on condition can absorb a range of travel of the photodiode sensor 84, through its sleeve mount 86, then the spring can maintain the photosensor in contact with the barcode track in small compensatory range for minor fluctuations in the slide position of the roller during its rotation. This example of digital generation retains the friction wheel 92 and clip contact switch unit 94 to sense direction of rotation; however with the provision for each roller of two photodiode sensors placed out of phase a to each other or appropriate barcode, platform direction of rotation can be sensed by logical processing of the two digital signals by using generically available integrated circuits. By providing two out of phase photo sensors, direction can be determined based upon a movement of only two alternating conditions, light and dark. However, if it is desirable not to employ two photo sensors, a single photo sensor can read a barcode which includes a repeating sequence of three symbols which can provide the data for logical determination of direction from their order of presentation and rotation.

Regardless of the makeup of original signals generated by roller rotation, the signal is expected to end in digital translation for computer control, but signals could be retained in or translated to analog signals for application in eletromechanical control of machines.

Using the sensor between the rollers 18 and 20 enables the sensor to be responsive to the movement of the rollers. The operator may then be free to continue contacting the keyboard while he is entering data by the motion of his forearms on the rollers.

There are electrical connections (not shown) from the switches 82, 94, the photodiode switch 98, and potentiometer 102 to computer 14 in a similar manner as a mouse would be connected to the computer which is manipulated by a person's hands as is known to those skilled in the art.

Figures 10, 11, 12:
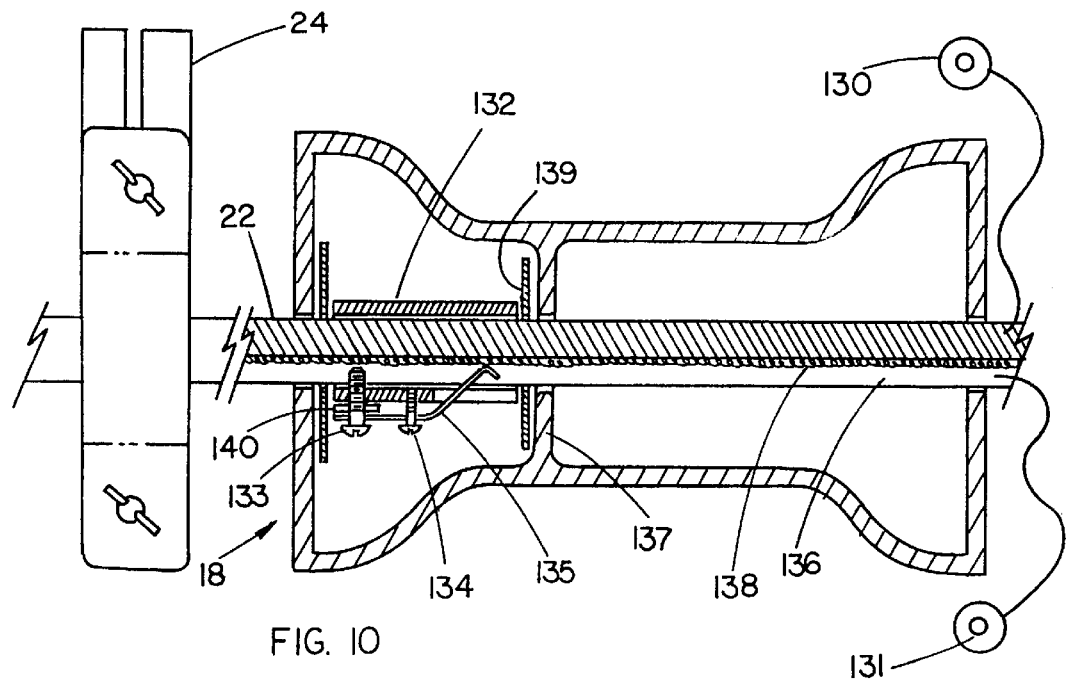
FIG. 10 is a sectional view of a roller and part of an axle showing an alternative embodiment to that of FIG. 7, which is deriving an electrical signal that correlates to the roller position in a range of slide.
FIG. 11 is a bottom elevational view of the sensing means of FIG. 10.
FIG. 12 is a side elevational view showing a portion of the sensing means of FIG. 10.

Referring to FIG. 10, there is demonstrated an optional or supplemental method to generate data by means of roller lateral movements on the axle. By defining left and right cursor movement with this method and defining up and down cursor movement with the rotary sensing method already described, a single roller can provide full two dimensional cursor control. In this form a single foot switch could enable the mode of roller sensing.

FIG. 10 shows the left roller 18, a portion of its axle 22, and the extension piece 24 of the left support arm. The view is cross-sectional in the frontal plane along the axis of the axle and its underside groove 136 which contains a longitudinal resistive element 138. The hollow roller 18 is modified by the addition of a protrusion 137 to contain a rider 132 which moves along the axle with the roller. Trust washer bearings 139 are provided between the rider and the interior surfaces of the roller that not only slide but must rotate against the rider when the roller is in use.

The resistive element 137 is electrically insulated from the axle by an insulator backing (not shown) and communicates with the interpretive electrical circuits by a resistor lead 131. Moveable rider 132 carries a spring contact 135 which passes through a slot in the rider to contact the exposed surface of the resistive-element 138. Screw 133 holds the spring contact elevated from the rider surface upon a spacer washer 140 and protrudes into groove 136 so as to align the rider in relation to the froove. A second screw 134 centers the spring contact, but also may adjust spring tension at the resistor surface by varying the amount of depression force.

The rider is intended to include conductive metallic material so that spring contact with the resistor element completes a circuit to the metallic axle and to an axle lead 130. The axle may be electrically insulated at its contact with support 24 and other mounts. The configuration of these roller, axle, and rider parts has defined a linear variable resistor with the roller moving the pointer along the resistive gradient and the axle itself providing the path for a completed circuit for any position chosen along the resistor length. By appropriate circuitry in common usage, the variable resistance derived from this single circuit can generate a continuously variable amplitude and direction along a single vector gradient.

In FIG. 11 there is shown a pictorial underside view of the rider with spring contact 135, mounting screws 133 and 134, and washer 140. The slot 141 can be seen in the body of the rider so that the spring reaches into the axle groove which contains the resistor element.

FIG. 12 shows a cross-section of the axle at screw 133 to demonstrate that the screw extends into the groove to provide alignment of the rider so that rotary stresses that reach the rider, in spite of the thrust bearing washers 139 previously shown, are not conveyed to the delicate spring contact. The protruding 133 screw does not contact the more recessed resistive element 138. In this crosssection the insulation backing 142 of the resistor element is shown.

Figure 9:
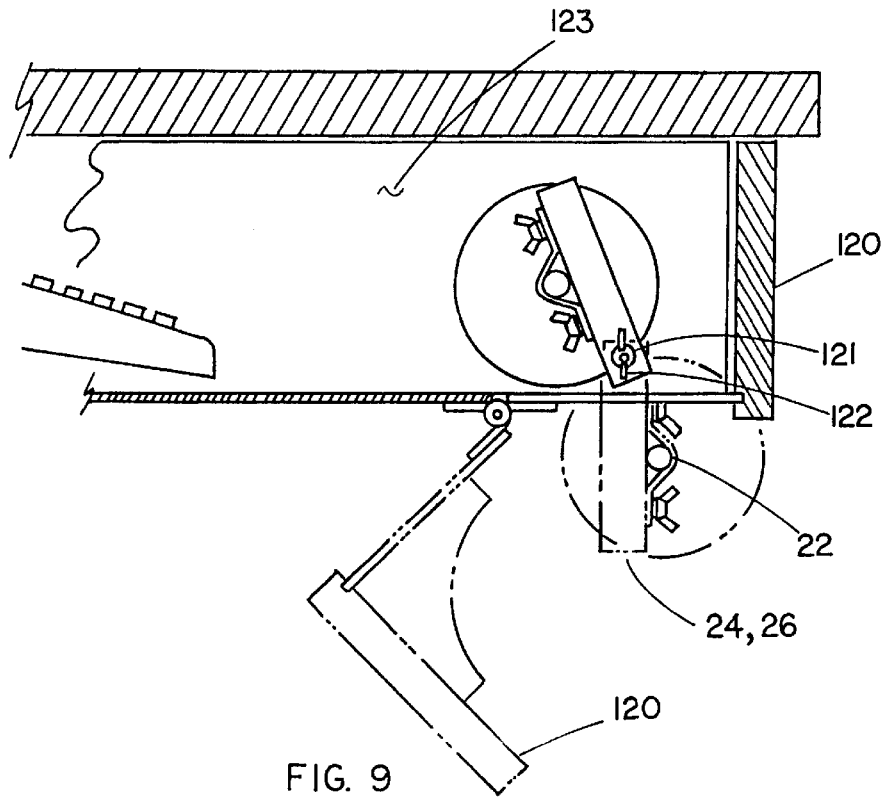
FIG. 9 is a side view of a roller upon axle unit mounted in a modified drawer shown both in storage and in use positions.

FIG. 9 shows a modification of a drawer which is typically rather shallow in height to contain a retracted axle and rollers and support the same during use wherein a keyboard would rest on the remaining drawer bottom. Obviously the drawer is first opened from the desk for use. The front face braced in conjunction with to a portion of the bottom n of the drawer comprises the frontpiece 120 which can be held in closed or open positions by various common latches including slide bolts and/or eye hook arrangements. With the front piece in closed or in open configuration, the axle is accordingly retracted in storage or suspended in use by a tubing which may be identical to extension piece 24, previously described, except that it pivots in relation to the sides of the drawer at an axis 121 which is a pair of holes drilled in the sides of the square tubing 24 such that the axis is in the horizontal and frontal planes. The extension piece 24 is held to a hole in the side of the drawer by a common machine screw through the drawer side 123 and the extension piece 24 to wing nut 122 which is innermost. Various means can anchor a drawer in fixed out position for stable keyboard operation including simple screws which wedge the drawer against the underside of the desk top; in such case the screws could be on either side piece of the drawer towards the rear which is exposed only when the drawer is out.

As described earlier attachment of a basic axle and rollers to a shelf or platform by many simple, fixed means can aid hand operation of keyboard or other hand tasks carried out on the same surface. The means of attachment described are only to enhance portability and adjustability of a given axle, roller, and work object relationships. The drawer mounting demonstrates further benefit of secure storage within a drawer and adjustable movement of the axle and rollers into use. Of course the added feature of data generation by sensing of roller movement is pertinent to various control or data tasks regardless of the mounting system employed for the axle, roller, and sensor apparatus. Bringing any of these features into modified use for leg and foot function is a further application of the concepts described.

By using the above described apparatus the computer operator will be relieved from the tension associated with the use of the keyboard for long periods of time because of the use of the above described adjustable rollers which both roll radially as well as move axially. The operator also is enabled to provide information directly to the computer by manipulating a roller with a forearm surface in various combinations of rotary position or slide position. Thus the support apparatus increases the efficiency of the keyboard operator.

From the foregoing description of the preferred embodiments of the invention it should be clear that many modifications may be made without departing from the true spirit and scope of the invention.

What is claimed is:

1. An apparatus for supporting a human operator appendage at a work station and allowing support of said appendage during motions imparted generally in front of said operator both laterally and forward and back in relation to said operator wherein at least one roller is mounted on an axle, said axle is mounted on at least one bracket in proximity to said work station, said roller is enabled to rotate and slide upon said axle, said appendage is engaged to bear generally on an upper cylindrical surface of said roller, during any movement.

2. An apparatus as set forth in claim 1 wherein a work surface is incorporated into said work station, a bracket is joined to said work surface said axle is attached to said bracket.

3. An apparatus as set forth in claim 1 wherein said roller has a substantially cylindrical shape with variable radius along its length such that radii in the middle region are smaller than radii toward either end from said middle region.

4. An apparatus as set forth in claim 2 said bracket incorporates a clamp said axle removable from said work surface by release of said clamp.

5. An apparatus as set forth in claim 4 wherein said clamp contains two screw elements, a part of said work surface being pressed between said clamp an said bracket by the opposing expansion and compression forces of the two screws.

6. An apparatus as set forth in claim 2 wherein said axle is attached to said bracket at one end of said axle and a second bracket is joined to said work surface for attachment at the second end of said axle.

\* \* \* \* \*